(12) United States Patent
McFarland

(10) Patent No.: US 7,139,239 B2
(45) Date of Patent: Nov. 21, 2006

(54) SELF-HEALING CONTROL NETWORK FOR BUILDING AUTOMATION SYSTEMS

(75) Inventor: Norman R. McFarland, Palatine, IL (US)

(73) Assignee: Siemens Building Technologies, Inc., Buffalo Grove, IL (US)

( * ) Notice: Subject to any disclaimer, the term of this patent is extended or adjusted under 35 U.S.C. 154(b) by 0 days.

(21) Appl. No.: 10/958,770

(22) Filed: Oct. 5, 2004

(65) Prior Publication Data

US 2006/0074502 A1   Apr. 6, 2006

(51) Int. Cl.
| | |
|---|---|
| G01R 31/08 | (2006.01) |
| G06F 11/00 | (2006.01) |
| G05B 9/02 | (2006.01) |
| G05B 23/02 | (2006.01) |
| H03K 17/00 | (2006.01) |
| H04L 12/56 | (2006.01) |
| G05B 11/01 | (2006.01) |
| G06F 15/173 | (2006.01) |

(52) U.S. Cl. .......................... 370/228; 700/20; 700/21; 700/82; 709/223; 709/239; 714/4; 340/2.23; 340/3.43

(58) Field of Classification Search .................... 700/2, 700/4, 19–21, 79, 82, 99, 275, 276; 702/33, 702/35, 188; 709/223, 238, 239; 714/1–5, 714/8, 10–13, 47, 100; 340/3.1, 539.1, 3.43, 340/3.44, 310.11, 2.23, 825; 370/216–228
See application file for complete search history.

(56) References Cited

U.S. PATENT DOCUMENTS

| | | | | |
|---|---|---|---|---|
| 5,390,326 | A * | 2/1995 | Shah | 370/222 |
| 6,047,222 | A * | 4/2000 | Burns et al. | 700/79 |
| 6,574,234 | B1 * | 6/2003 | Myer et al. | 370/462 |
| 6,851,621 | B1 * | 2/2005 | Wacker et al. | 236/51 |
| 6,871,299 | B1 * | 3/2005 | Havekost et al. | 714/47 |
| 6,967,565 | B1 * | 11/2005 | Lingemann | 340/310.11 |
| 6,968,242 | B1 * | 11/2005 | Hwu et al. | 700/82 |
| 7,003,558 | B1 * | 2/2006 | Agrusa et al. | 709/223 |
| 2002/0019725 | A1 * | 2/2002 | Petite | 702/188 |
| 2003/0151513 | A1 * | 8/2003 | Herrmann et al. | 340/573.1 |
| 2003/0176388 | A1 | 9/2003 | Semenkovich | 514/44 |
| 2003/0212821 | A1 * | 11/2003 | Gillies et al. | 709/238 |
| 2003/0227931 | A1 | 12/2003 | Chen et al. | 370/408 |
| 2004/0160324 | A1 * | 8/2004 | Stilp | 340/572.1 |
| 2004/0212497 | A1 * | 10/2004 | Stilp | 340/539.17 |
| 2004/0260407 | A1 * | 12/2004 | Wimsatt | 700/19 |
| 2005/0038326 | A1 * | 2/2005 | Mathur | 600/300 |
| 2005/0049754 | A1 * | 3/2005 | Ogawa et al. | 700/275 |
| 2006/0028997 | A1 * | 2/2006 | McFarland | 370/252 |
| 2006/0071782 | A1 | 4/2006 | Ahmed et al. | |

OTHER PUBLICATIONS

Excerpts from 802.15.4-2003—Wireless MAC and PHY Specifications for LR-Wans; IEEE, 2003; pp. 149-151.

* cited by examiner

Primary Examiner—Crystal J. Barnes

(57) ABSTRACT

In building automation architectures, components may be associated through physical communications paths and at a different level through building automation applications. Building automation applications implement control processes for a building function. Due to changing needs, such as a failure of a physical communications path or the addition or removal of components, the building automation application may be more appropriately performed in a different device. By dynamically positioning or determining a processor for implementing a building automation application, an architecture or network may more optimally control building functions, such as by requiring less user input, more rapid response and/or avoiding building function failures.

32 Claims, 2 Drawing Sheets

SELF-HEALING CONTROL NETWORK FOR BUILDING AUTOMATION SYSTEMS

BACKGROUND

The present invention relates to building automation systems. In particular, a wireless building control architecture implements automation of building systems.

Building automation systems include heating, ventilation and air conditioning (HVAC) systems, security systems, fire systems, or other systems. The systems are typically formed from distributed components wired together. HVAC systems may be formed with three separate tiers or architectural levels in a tree or hierarchal distribution. A floor level network provides general control for a particular floor or zone of a building. Controllers of the floor level network provide process controls based on sensor inputs to operate actuators. For example, a temperature sensor is read. An adjustment of a damper, heating element, cooling element or other actuator is determined based on a set point and the measured temperature. Other basic control functions for room comfort may be provided, such as by using single input, single output feedback loops employing proportional-integral-derivative methods. The building level network integrates multiple floor level networks to provide consistent control between various zones within a building. Panels or other controllers control distribution systems, such as pumps, fans or other central plants for cooling and heating. Building level controllers may communicate among themselves and also access floor level controllers for obtaining data. The management level network integrates control of the building level networks to provide a high level control process of the overall building environment and equipment. Single or dual level architectures may also be provided.

To reduce costs associated with wiring, wireless architectures for building automation systems have been proposed. Wireless standards provide single tier networks or multiple tier networks for implementing a single building automation process. For example, a multi-tier wireless network emulates current wired building automation systems. A controller wirelessly communicates with sensors and associated actuators. The lower level sensors and actuators provide mere input and output functions controlled by controllers. As another example, a hub and spoke control is proposed in U.S. patent application Ser. No. 10/353,142, the disclosure of which is incorporated herein. A controller may be integrated with an actuator, a sensor or combinations thereof. An additional layer or tier uses wireless communications for management of local functions as well as management of building wide subsystems, such as a chiller or building fan.

IEEE 802.15.4 standardizes wireless integrated building automation systems. Reduced function devices (RFD) with limited processing power communicate with full function devices. Full function devices (FFD) provide peer-to-peer wireless communication for controlling other reduced function devices. The standard contemplates hub and spoke physical communications path network configuration between an RFD and associated FFDs while using peer-to-peer communication between FFDs.

IEEE 802.15.4 describes self healing communications paths. Reduced function devices communicate only with full function devices according to a binding association between the two devices. If a controller or full function device malfunctions, the wireless topography may be used to link the reduced function device to a different controller or full function device according to predetermined associations. The new link forms a physical communications path for the reduced function device to communicate with other components of the network.

BRIEF SUMMARY

By way of introduction, the preferred embodiments described below include methods and systems for wireless building automation control. In building automation architectures, components may be associated through physical communications paths and at a different level through building automation applications. Building automation applications implement control processes for the building function. Due to changing needs, such as a failure of a physical communications path or the addition or removal of components, the building automation application may be more appropriately performed in a different device. By dynamically positioning or determining a processor for implementing a building automation application, the building automation architecture may more optimally control building functions, such as by requiring less user input, more rapid response and/or avoiding building function failures.

In a first aspect, a system is provided for self-healing automated building control. A first processor is operable to run a control application for building automation within a building. A second processor in the building and remote from the first processor is operable to communicate with the control application. A third processor in the building is also remote from the first and second processors. The control application is operable to be implemented on the third processor in response to a failure of the communication with the second processor.

In a second aspect, a system is provided for self healing automated building control. A first processor is operable to run a building automation application. The first processor is in a building and operates using wireless communications. A second processor is remote from the first processor. The second processor is operable to run the building automation application. The second processor is in the building and also operable for wireless communication. The building automation application is operable to be initially implemented on the first processor and later implemented on the second processor in response to a change associated with the first processor.

In a third aspect, a method is provided for self healing automated building control. Control of the building function is automated with a building automation application running on a first processor. Communications associated with the building automation application are wireless. A change associated with the first processor is detected. The building automation application is then implemented on a second processor remote from the first processor in response to the detected change.

The present invention is defined by the following claims, and nothing in this section should be taken as a limitation on those claims. Further aspects and advantages of the invention are discussed below in conjunction with the preferred embodiments and may later be claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Wireless building automation control is provided for safety, environmental, security, hazard, combinations thereof or other building systems. The control processes for automation are distributed. Associations between the controllers, sensors and actuators may be modified and updated with changing needs of the system, including modification of a location of a control process or application.

Control processes are run on the controllers, sensors and actuators as appropriate for the particular operations of each device, such as using an object oriented control distribution. The sensor reports information appropriate or specific to the sensor, such as reporting the result of a comparison of a measured value to a desired or set point value. Actuators use the output sensor data to provide a response appropriate for the actuator. Controllers monitor the process or action of sensors and actuators without control in one mode of operation. In another mode of operation, the controllers override the sensor and/or actuators to alter processing based on a regional or larger area control process. Alternatively, the controllers run processes to measure deviation from a set point and control the response.

Figure 1:
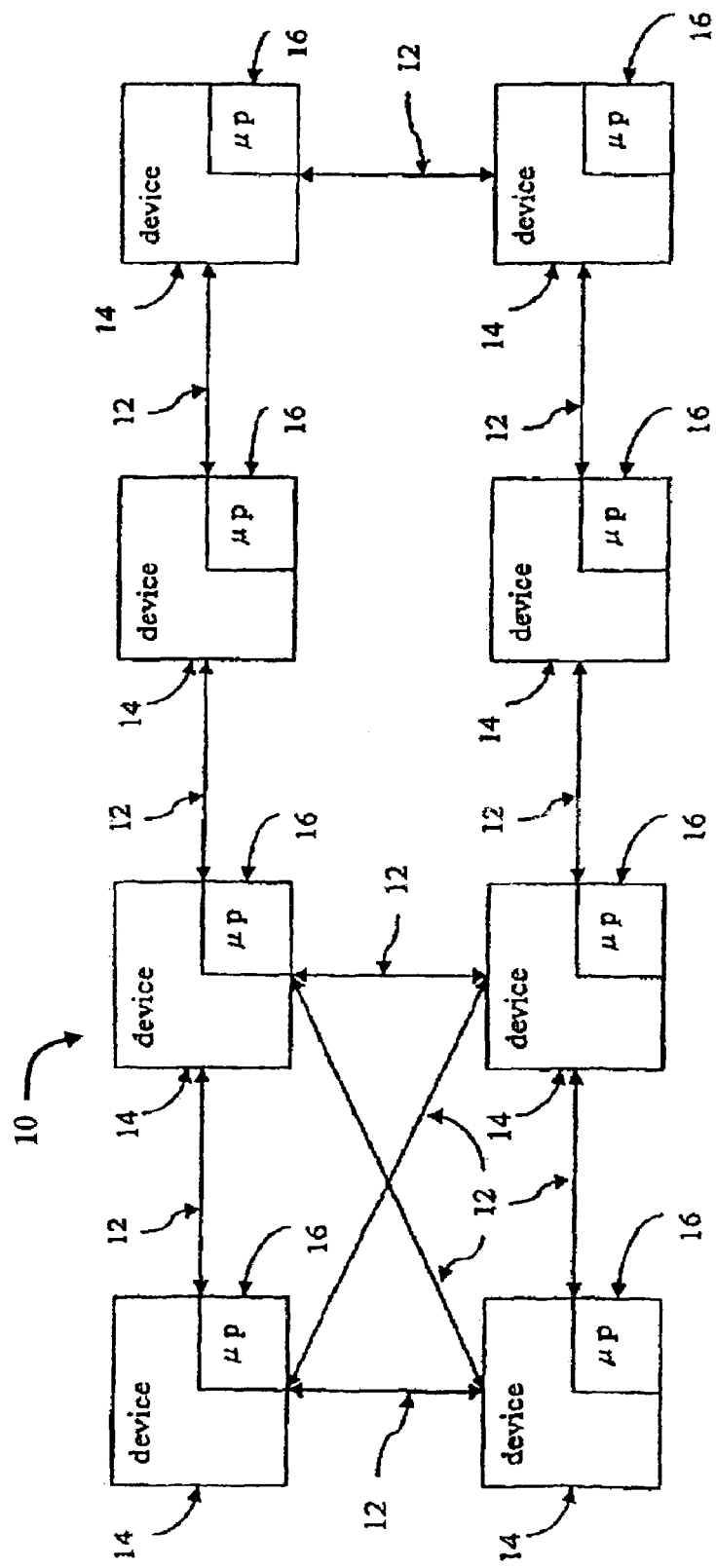
FIG. 1 is a block diagram of one embodiment of a self-healing building automation network.

FIG. 1 shows one embodiment of a building automation network 10 with self-healing building automation applications. The network 10 includes a plurality of building automation devices 14 interconnected by physical communications paths 12. The physical communications paths 12 are set or may be altered and are used by building automation applications for communicating between the building automation devices 14. Any now known or later developed building automation networks may be used, such as a wired hierarchal network. As another example, the network 10 is entirely or partially wireless, such as disclosed in U.S. patent application Ser. No. 10/915,034, the disclosure of which is incorporated herein by reference. The network 10 implements HVAC, fire, security, lighting, other automated building function or combinations thereof. The building automation devices 14 and associated communications paths are organized in a hub and spoke pattern, parallel pattern, serial pattern, random pattern, distributed pattern, or combinations thereof.

For a wireless network, the network 10 operates pursuant to any now known or later developed wireless communications protocols for establishing the physical communications paths 12. For example, the network 10 operates pursuant to the 802.15.4 for one portion and pursuant to the 802.11x protocol (e.g., 802.11a 802.11b, 802.11c . . . 802.1 μg) for another portion, but Bluetooth, wifi, computer network, Ethernet, proprietary, or other standard wireless communication protocols may be used alone or in combination. 802.15.4 and 802.11x provide medium access control and a physical interface to the wireless medium. Any now known or later developed network and transport algorithms may be used.

Communication, transport and routing algorithms are provided on the appropriate devices. Any packet size or data format may be used. Different bandwidths for any given communications path 12 may be provided, such as adapting a lower level network for small data packets transmitted over short distances as compared to the higher level network adapted for larger data packets at higher rates and for longer distances. In alternative embodiments, the same communications protocol is used for the entire networks 10.

Routing is performed within the network 10 using any protocol, such as a MESH routing, token, or a protocol provided by Dust Networks. For example, time division multiplexing is used to assign infrequent contact times between bound components and allow for sleeping or reduced function of components at other times for saving battery life.

Different frequencies, codes or other communications differences may be used for different groups of components, such as by floor, by type (e.g., HVAC versus security or temperature versus air flow), the entire network or by other zones. By dividing up portions of the network, the communications processing load on the network 10 may be minimized. Communications between the different nodes on the network 10 may be performed by adjusting a transmit and/or receive function for communication with the node of interest. By providing differences in communications for different zones, different customers in the same building may be isolated using the same wireless network. Different types of systems (e.g., HVAC and security) may be isolated from each other as well. Alternatively, the systems or customers are integrated and operate together.

The building control system devices 14 include processors 16 for operation as sensors, actuators and/or controllers. For example, sensor arrangements communicate with actuator arrangements. Paired or larger groupings of actuator and sensor arrangements are operable together using point-to-point or peer communications without further control by other controllers. Paired or grouped sensor and actuator arrangements are dynamically, automatically or manually associated with each other. For example, a sensor arrangement within a room is bound to an actuator arrangement associated with the room, such as for temperature sensing within the room to control a damper and/or heating or cooling elements associated with air flowing into the room.

Other building automation devices 14 may include personal computers, panels, or monitors. For example, one building automation device 14 is an actuator for controlling a building wide component, such as a chiller, boiler, building intake vent, or building air flow out take vent. Using the building automation devices 14, the network 10 controls major or building wide equipment, individual spaces or local input and output points.

In one embodiment, the building automation devices 14 operate as full function devices of 802.15.4 allowing for dynamically assigned communications with different devices over a single or multiple communications paths with or without the ability to route communications from other devices. Reduced function devices of 802.15.14 are provided with the increased capability of direct communication with each other and the ability to address other devices for routing to the other device. For example, a temperature sensor arrangement is provided with a plurality of network address locations to receive temperature information. The temperature sensor arrangement communicates directly with an actuator arrangement for implementing local control processes. Transmissions addressed to other devices, such as one or more controllers are also transmitted. The receiving controller then routes the signals to the desired or addressed controller. The assigned addresses may be dynamically programmed by one or more controllers or are established during installation or manufacturing. By avoiding routing functions, less memory, less processing, less power and cheaper cost sensor and/or actuator arrangements may be provided.

As a sensor arrangement, the building automation device 14 includes components connected together on a same circuit board, in a same housing, connected with a same power source or otherwise arranged for operation together. In one embodiment, the sensor is spaced from the processor 16, such as connecting through a length of wire. The sensor is a temperature sensor, humidity sensor, fire sensor, smoke sensor, occupancy sensor, air quality sensor, gas sensor, $CO_2$ or CO sensor or other now known or later developed sensors, such as an oxygen sensor for use in hospitals. Micro-electro-mechanical sensors or larger sensors for sensing any environmental condition may be used. In one embodiment, the sensor includes a suit of sensors for sensing multiple environmental conditions.

As an actuator arrangement, the building automation device 14 includes components positioned on the same circuit board, within a same housing, adjacent to each other, or spaced from each other. For example, the actuator is a mechanical or electromechanical device attached in a separate housing to the processor 16. The actuator is a valve, relay, solenoid, speaker, bell, switch, motor, motor starter, damper, pneumatic device, combinations thereof or other now known or later developed actuating devices for building automation. For example, the actuator is a valve for controlling a flow of fluid or gas in a pipe. As another example, the actuator is a relay or other electrical control for opening and closing doors, actuating lights, or starting/stopping motors. As yet another example, the actuator 40 is a solenoid to open or close a door or damper, such as for altering air flow.

The actuator arrangement is spaced from sensor arrangement such that communications paths 12 are used for intercommunication. The actuator arrangement is placed within a room or associated with a room. For example, the actuator arrangement is positioned above a ceiling of a room or in a hallway near the room for controlling a damper, heating element, cooling element, sprinkler, alarm or other device.

As a controller, the building automation device 14 interacts with other building automation devices 14 for establishing, setting, altering, instructing, reporting or routing information for controlling building automation functions. The controller may or may not also include a sensor or actuator.

The processors 16 are each a general processor, digital signal processor, application specific integrated circuit, field programmable gate array, analog circuit, digital circuit, combinations thereof or other now known or later developed device for implementing a building automation application. Different or the same processors 16 or types of processors 16 are used for each of the building automation devices 14. Actuator processors may be of a similar processing power and memory capability as sensor processors, such as a processing power or capability and associated memory corresponding to the specific sensor or actuator or corresponding to the needs of one of a plurality of different types of sensors or actuators with a maximum desired processing power, such as an 8 or 16 bit processor. By minimizing the processor requirements and associated memory, the cost of the sensor or actuator arrangements may be reduced. Controller processors 16 may be full function devices pursuant to the 802.15.4 standard, implementing a programmable power process language application. The controller processors 16 have a greater processing power and storage capacity than processors of the sensors or actuators, but may be same or smaller size, power or memory. For example, a 16, 32 or 64 bit processor is used.

The processors 16 or different processors implement communications protocols, such as creating, changing, or assigning physical communications paths 12. The communications protocols control receiving and/or transmitting signals and the associated formats. The communications protocols may be different for different types of radio frequency or acoustic transmitters, receivers or transceivers. The communications protocols may control various aspects of the communications paths, such as changing transmitted power, frequency, data format, interference avoidance technique or other transmission or reception property either automatically or in response to control signals.

The processors 16 implement building automation applications for controlling building functions. The building automation applications are programmed with programmable powerful processing control language (PPCL) or other language. Inputs are received from one or more other local or remote devices, such as a controller, sensor and/or actuator. The inputs are used to perform the building automation application, such as determining an actuator adjustment, an output value or an instruction. Alternatively, the building automation application implemented on a specific processor 16 operates without further input.

The building automation applications control one or more automated building functions. For example, any of the building automation applications (control processes) disclosed U.S. patent application Ser. No. 10/915,034 are used. The building automation applications are control applications for controlling building functions, such as a temperature sensor application, an actuator application, a sensor application, an alarm application, security application, a building environment application, a HVAC application, or a combination of other applications. For example, an application operates with a sensor to output a sensor reading value to be used by other applications or devices. Similarly, an actuator application receives sensed input information or other control instructions and processes the data to operate or alter the position or settings of an actuator. A temperature sensor or thermostat application determines a current temperature or determines that the temperature has exceeded (above or below) a threshold. The temperature sensor application then outputs an indication of the current temperature, degree of excess past the threshold, or other temperature related information. In response, an actuator control application causes a changing fluid flow or air flow for altering a temperature within a room or area. As another example, a building automation application receives sensor information and determines an actuator adjustment as a central control routine. Similarly, lighting, security, fire or other building functions may be controlled with a building automation application.

The control or building automation application may alternatively or additionally include coordination or higher level control. For example, a controller implements a coordination control application for overriding, setting, adjusting or altering the operation of another building automation application. A coordination control application may indicate a change to a threshold levels for a single or plurality of temperature sensors, such as associated with implementation of a brown-out in a region. The coordination control application outputs new settings or instructions for other devices and associated building automation applications.

One or more building automation applications are implemented on a same processor 16 or building automation device 14. Each building automation application or control application is implemented on a single processor 16 or a single building automation device 14. In alternative embodiments, a building automation control application is distributed across a plurality of processors 16 in the same building automation device 14 or in different building automation devices 14.

The building automation application or control applications for building functions may rely on communications with other applications or devices. For example, a particular temperature sensor is bound in an application or processing level to another application, such as associated with an actuator in a same room. A controller may or may not also be bound to the temperature sensors and actuator. Other bindings are possible, such as binding a sensor to a controller for monitoring performance of the temperature sensor. The controller may be the same or different than a controller for resetting temperature threshold values or other characteristics of temperature sensing control application. The bindings of applications may be independent of physical communications paths. For example, a mesh routing or other routing mechanism may pass information through any number of different routes between two bound applications. Where a single communications link is provided to a building automation device 14 and the associated control or automation application running on the processor 16, the physical communications path may also correspond to two bound applications. In alternative embodiments, the building automation application operates without any further input or output on a single building automation device 14 or processor 16. Wireless communication paths may be provided for infrequent reception of control instructions.

Referring to FIG. 1, various ones of the building automation devices 14 and associated processors 16 are operable to run control applications for building automation within the building controlled by the network 10. In one embodiment, building automation applications run by the processors 16 communicate using wireless communications on the communications paths 12. Different ones of the applications may be implemented on different processors 16. For example, one processor 16 accesses a controller for controlling a sensor and/or actuator processor 16 on one or two other devices 14. The processor 16 operating as the controller communicates with the sensor or actuator processor 16 wirelessly or over other communications paths 12. The communications may be direct, such as over a single physical link, or indirect, such as routed through one or more other devices 14. Yet another processor 16 of a different controller, sensor, actuator or other device 14 is operable to implement the same application, such as run on another controller, another sensor or another actuator.

Each of the processors 16 is positioned remote from other processors. For example, one processor is positioned adjacent to a thermostat, another processor is positioned adjacent to an actuator, and yet another processor is positioned centrally to a region, floor, room, building or other location. In alternative embodiments, one or more processors 16 running different applications are positioned adjacent to each other, such as in a same room and a same housing.

The building automation or control application for a given building function is initially implemented on a processor 16. The building automation application may be later implemented on a different processor 16 in response to a change associated with the original processor 16. For example, a failure of the processor 16 or an associated component is detected. As another example, a failure of a communications path with the original processor 16 is detected. As yet another example, the network is reconfigured, such as associated with adding or removing components. In response to reconfiguration, a more optimal distribution of building automation applications with respect to corresponding devices 14 is determined.

In response to the failure or other detected change, the control application is switched over to be implemented on a different processor 16. In one embodiment, the building automation application is copied to a different processor. Alternatively, the control application software is stored at the other processor as a dormant application and not run until a change or the switch in implementation is desired. In yet another alternative, a further control processor transmits or otherwise controls the location for implementing a given application, such as managing a data base for downloading an application as needed to different processors 16. The database or other information may include ongoing data representing current or recent operation of the original processor 16. Alternatively, the application as implemented on the back-up processor 16 is run independent of any previous implementation on the other processor.

Failure may be detected by a time-out mechanism, such as providing a time period for expected communications. If the time period is exceeded without receiving communications, a failure is detected. A sensor and actuator may be associated with different control applications on other processors. If one of the other processors fails to communicate with the sensor and/or actuator, a sensor and/or actuator requests implementation of the control application on a different processor. Similarly, a controller may determine that a controlled sensor or actuator application has failed. The controller then requests or instructs implementation of the application on a different processor 16. Alternatively, a processor 16 transmits an alarm signal or other information showing a failure. Change may be detected by the system reconfiguring itself, identifying new communications paths, being manually altered, or other changes detected by the processor 16 or indicated by control functions.

The switch in implementation of the applications between different processors occurs independently of or in conjunction with a failure of a physical communications path. For example, a processor implementing an application that has a single physical communications path to another processor may be associated with the communications path failure. In response, a different processor associated with an operational communications path implements the application.

The switch between processors for implementing a control application may be independent of physical networks communications path failure. For example, a plurality of physical communications paths are assigned as a function of location within a building for forming the network 10. A failure in processing, in a sensor, in an actuator or other failure is detected. An application is then implemented on a different processor 16 in response to the failure even though the physical communications paths 12 remain unchanged. For example, an actuator associated with air flow within a room fails. The building automation application controlling the actuator senses the failure and indicates malfunction of the actuator. In response, the building automation control application for air flow within the room is switched to a back up actuator and associated device 14. Alternatively, the application is switched to a main trunk actuator for adjusting the air flow to a plurality of rooms. The application may be altered to account for control of multiple rooms rather than one room. Since the building automation or control applications operate at a level different than the physical communications network, independent switching of applications between processors 16 from communications paths may be used.

Where an application is associated with other applications, such as transmitting sensed values for actuation, monitoring or control or receiving sensed values to operate an actuator, implement a regional control or monitor performance, the switch of the application from one processor 16 to another processor 16 maintains the information. For example, one or more control processors 16 monitor the bindings between applications. When a switch in implementation of an application is detected or instructed to occur, the binding is communicated to the new processor 16 and associated application. Alternatively, automated processes determine the appropriate application and associated processor 16 for a given application and establish a new binding. For example, bindings are automatically generated by the network. Upon switch of an application to a different processor 16, the same process is used to establish new bindings. Alternatively, the bound applications associated with a switched application detect the switch and communicate the previous bindings to the new application and processor 16. In yet another embodiment, a processor 16 originally implementing an application communicates the bindings to processors 16 subsequently implementing the application. By determining the bindings, the later implementing processor 16 is able to identify sensors, actuators or controllers for implementing the building automation function responsive to the building automation or control application.

Figure 2:
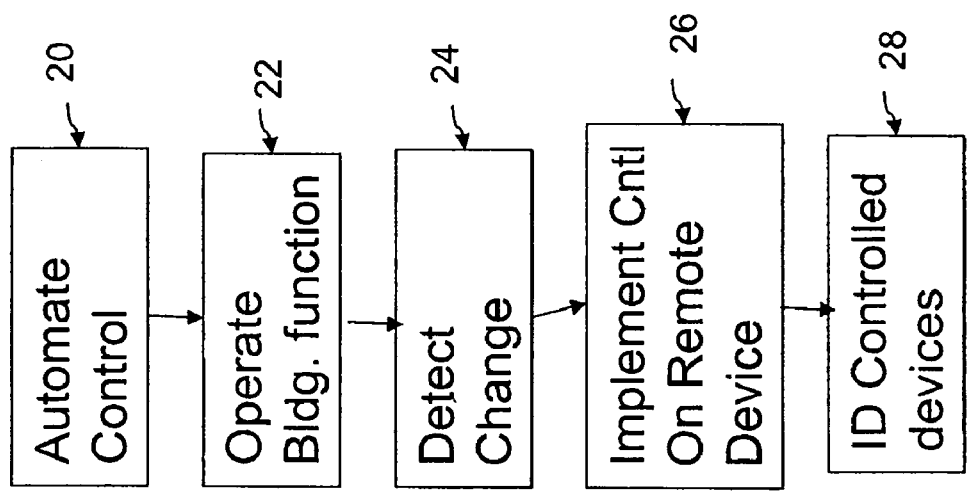
FIG. 2 is a flow chart diagram of one embodiment of a method for self-healing automated building control.

FIG. 2 shows one embodiment of a method for self-healing automated building control. The method is implemented using the network 10 of FIG. 1 or a different network. Additional, different or fewer acts may be provided than shown in FIG. 2. For example, act 28 may be skipped.

In act 20, control of a building function is automated with a building automation application. The application is software, firmware or hardware for sensing, actuating or controlling. The building automation application is implemented on a processor. Communications for inputting or outputting information associated with the building automation application are performed over wireless transmissions, such as using radio frequency or acoustic signals.

The building automation application is different than a network communication function. For example, the building automation applications operate to control the environment, generate alarms, react to alarms or perform other processes within a building for influencing the environment or components within the building. Network communications controls establish and maintain the physical communication paths of the network. The same or different processor may implement communications controls as building automation applications.

The automation to control a building function may include multiple processors. For example, operation of a processor associated with the building automation application is wirelessly controlled by another building automation application. The sensing, actuating or other activity of the processor is controlled by another processor and its associated building automation application. As an alternative to operating the application as a controller, the application operates with respect to a sensor or an actuator that includes or does not include wireless control of other processors or associated applications.

In act 22, the building function is operated. For example, the application causes sensing or actuating for implementing a building HVAC, fire, security, lighting or other function automatically. Different processors implement the same, similar or different applications. The building function may be controlled by two or more applications, such as one application associated with sensing and another application associated with actuating. The processors associated with the two different applications communicate, such as one processor transmitting and the other receiving, for implementing the building function automatically.

In act 24, a change is detected associated with one of the processors or associated applications. For example, a failure of a processor, the application, communications path, hardware, or other now known or later developed failure affecting the performance of an application is detected. As another example, reconfiguration is detected, such as associated with adding or removing a component to an overall network. The detected change may alter performance of the application. For example, a different binding occurs where a network is reconfigured. As another example, a failure may cause an application to cease proper operation.

In act 26, the building automation application is switched to be implemented on a different processor remote from the previously implementing processor. The switch occurs in response to the detected change. The logical binding of the applications or devices is altered to account for the detected change. The alteration is in addition to or different from reconfiguration the network communications path. For example, the physical network communications paths are assigned pursuant to IEEE 802.15.4. The physical network communications paths may be assigned as a function of location within the building, such as associating paths between logically bound components, (e.g. a sensor and associated actuator or actuators). Other communications paths may be established as a function of room, such as interconnecting various devices within a room and to an external controller. The switch of implementation of the application between two different processors is performed independent of physical network communications paths. Physical network communications paths interconnect various components directly or indirectly together. Due to the network routing, the selection of a processor for additional or later implementation of an application may be performed regardless of the communications paths. Alternatively, the building automation application is implemented on a different processor in conjunction with a switch in a communications path, such as for reconfiguration or failure of communications path. The number of communications paths between two components may alternatively be considered for determining the next processor for implementation of an application.

The redundant processor for implementation of an application is manually or automatically determined. For example, processors associated with the desired capabilities for an application are identified automatically. Actuators associated with air flow to a particular room are identified, temperature sensors associated with a particular room or areas adjacent to the room are identified, controllers operable to communicate directly or indirectly with particular other devices are identified or other processes are used. Once a processor operable to implement a given application is identified, the processor may be used as a redundant or back up processor in response to a detected change.

In act 28, controlled devices are identified. After an application is switched to a different processor, the devices associated with the application being implemented are identified. In one embodiment, the devices publish or broadcast their identification as being associated with a particular application. Alternatively, a controller instructs a given application to operate with particular devices. In yet another embodiment, a processor implementing an application seeks out or determines other devices associated with the application. For example other devices located within a same room are identified by the network configuration and the associated function.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

I claim:

1. A system for self-healing automating building control, the system comprising:
   a first processor operable to run a control application for building automation within a building and direct a network having a plurality of processors;
   a second processor in the building and remote from the first processor, the second processor operable to communicate with the control application via a communications path; and
   a third processor in the building and remote from the first and second processors; wherein the control application is operable to be implemented on the third processor in response to a failure of the communications path between the control application and the second processor or a reconfiguration of the network, and implementation of the control application on the third processor is independent of physical network communications paths.

2. The system of claim 1 wherein the control application is operable to be implemented on the third processor by running stored software.

3. The system of claim 1 wherein the physical network communications paths are assigned pursuant to IEEE 802.15.4 or 802.11x.

4. The system of claim 1 wherein the physical network communications paths are assigned as a function of location within a building.

5. The system of claim 1 wherein the first, second and third processors are operable to intercommunicate wirelessly.

6. The system of claim 1 wherein the second processor comprises a sensor or an actuator processor and the first and third processors comprise controllers.

7. The system of claim 1 wherein the first processor seeks out particular devices associated with the control application.

8. The system of claim 1 wherein the first, second and third processors each comprise a sensor or an actuator processor.

9. The system of claim 1 wherein the third processor is operable to identify the second processor and a fourth processor remote from the second processor, the fourth processor operable with the second processor to implement a building automation function.

10. The system of claim 1 wherein the control application is operable to control a building automation function, the building automation function different than a network communication function of the system.

11. A system for self-healing automated building control, the system comprising:
   a first processor operable to run a building automation application, the first processor in a building and operable for wireless communication with a network of processors; and
   a second processor remote from the first processor, the second processor operable to run the building automation application, the second processor in the building and operable for wireless communication;
   wherein the building automation application is operable to be initially implemented on the first processor and later implemented on the second processor in response to a reconfiguration of the network, the building automation application implementing control for an environment of at least a portion of a building in response to a sensed environmental condition for the portion of the building the sensed environment condition being wirelessly communicated with at least one of the first and second processor implementing the building automation application.

12. The system of claim 11 wherein the building automation application further comprises any of a temperature sensor application, an actuator application, a coordination control application, an alarm application, a security application, and combinations thereof.

13. The system of claim 11 wherein the first and second processors connect with a building automation communications network, wherein the change associated with the first processor comprises a communications failure.

14. The system of claim 13 wherein physical network communications paths are assigned pursuant to IEEE 802.15.4 or 802.11x.

15. The system of claim 11 wherein the first and second processors connect with a building automation communications network, wherein the change associated with the first processor is independent of a physical network communications path failure.

16. The system of claim 11 wherein the first and second processors are operable to communicate with each other wirelessly.

17. The system of claim 11 wherein the first and second processors both comprise a sensor, an actuator or a controller processor.

18. The system of claim 11 wherein the building automation application switches from the first processor to the second processor in conjunction with or in response to a switch in a communications path.

19. The system of claim 11 wherein the second processor is operable to identify sensors, actuators or controllers for implementing a building automation function responsive to the building automation application.

20. The system of claim 19 wherein the second processor is operable to identify the sensors, actuators or controllers in response to communications from the respective sensors, actuators or controllers.

21. The system of claim 11 wherein the building automation application is operable to control a building automation function, the building automation function different than a network communication function of the system.

22. The system of claim 11 wherein the building automation application is later implemented on the second processor by running dormant software stored by the second processor.

23. A method for self-healing automated building control, the method comprising:
   (a) automating control of a building function with a building automation application on a first processor, communications associated with the building automation application being wireless;

(b) detecting a change in a communications path associated with the first processor; and then (c) implementing the building automation application on a second processor remote from the first processor in response to (b) and independent of physical network communications paths interconnecting the first and second processors.

24. The method of claim 23 further comprising:

(d) wirelessly controlling operation of a third processor with the building automation application during both (a) and (c).

25. The method of claim 24 wherein (d) comprises controlling sensing or actuating by the third processor with the first and second processors being controllers.

26. The method of claim 23 further comprising:

(d) assigning the physical network communications paths are assigned pursuant to IEEE 802.15.4 or 802.11x.

27. The method of claim 23 further comprising:

(d) assigning the physical network communications paths as a function of location within a building.

28. The method of claim 23 further comprising:

(d) communicating between the first and second processors wirelessly.

29. The method of claim 23 wherein (c) comprises switching the building automation application from the first processor to the second processor in conjunction with or in response to a reconfiguration of a network.

30. The method of claim 23 further comprising:

(d) sensing or actuating with each of the first and second processors.

31. The method of claim 23 further comprising:

(d) identifying by the second processor devices associated with the building automation application, the devices implementing the building function.

32. The method of claim 23 wherein (a) comprises automating control of the building function, the building function different than a network communication function of the system.

* * * * *